United States Patent
Coulter et al.

[11] Patent Number: 6,150,022
[45] Date of Patent: Nov. 21, 2000

[54] BRIGHT METAL FLAKE BASED PIGMENTS

[75] Inventors: Kent E. Coulter; Thomas Mayer; Roger W. Phillips, all of Santa Rosa; John S. Matteucci, Healdsburg, all of Calif.

[73] Assignee: Flex Products, Inc., Santa Clara, Calif.

[21] Appl. No.: 09/207,121

[22] Filed: Dec. 7, 1998

[51] Int. Cl.[7] .................................. C09C 1/62; C09C 1/60
[52] U.S. Cl. ......................... 428/403; 106/499; 428/404; 428/407
[58] Field of Search ..................................... 106/403, 404, 106/415, 419, 420, 425, 426, 428, 429, 430, 431, 436, 438, 439, 440, 441, 442, 444, 445, 447, 449, 450, 451, 455, 456, 459, 460, 461, 471, 472, 474, 476, 479, 480, 482, 483, 491

[56] References Cited

U.S. PATENT DOCUMENTS

| | | | |
|---|---|---|---|
| 3,011,383 | 12/1961 | Sylvester et al. | 359/584 |
| 3,123,490 | 3/1964 | Bolomey et al. | 106/415 |
| 3,412,575 | 11/1968 | Feldman et al. | 63/33 |

(List continued on next page.)

FOREIGN PATENT DOCUMENTS

| | | | |
|---|---|---|---|
| 0 353 544 | 2/1990 | European Pat. Off. | C09C 1/00 |
| WO 96/22336 | 7/1996 | WIPO . | |
| WO 96/38505 | 12/1996 | WIPO . | |
| WO 99/35194 | 7/1999 | WIPO . | |

OTHER PUBLICATIONS

Dobrowolski et al., Optical Interference Coatings for Inhibiting of Counterfeiting, *Optica ACTA*, vol. 20, No. 12, pp. 925–937, 1973, (no month).

Ahmed and Teer; A Simple and Inexpensive Rotating Barrel to Ion Plate Small Components, *J. Phys. E.Sci. Instrum*, vol. 17, pp. 411–416, 1984. (no month).

Window et al., Magnetically Confined Sputter Source WIth High Ion Flux, J. Vac. Sci. Technol. A., vol. 3, No. 6, pp. 2368–2372, 1985. (no month).

Window and Savvides, Charged Particle Fluxes From Planar Magnetron Sputtering Sources, *J. Vac. Sci. Technol. A*, vol. 4, Nos. 2, pp. 196–202, 1986. (no month).

Savvides and Window, Unbalanced Magnetron Ion–Assisted Deposition and Property Modification of Thin Films, *J. Vac. Sci. Technol. A*, vol. 4, No. 3, pp. 504–508, 1986. (no month).

Rancourt, Optical Thin Films, Users Handbook, p. 4, 1987. (no month).

Kim, Magnetron Sputter Deposited CoPtCr Magnetic Thin Films for Information Storage, Ph.D. Dissertation, Department of Metallurgical Engineering, The University of Utah, Jun. 1993.

Hermann and Bräuer, DC and RF–Magnetron Sputtering, and J. Becker, Ion Beam Sputtering, *Handbook of Optical Properties*, vol. 1, pp. 135–212, CRC Press, 1995. (No month).

(List continued on next page.)

*Primary Examiner*—Anthony Green
*Attorney, Agent, or Firm*—Workman, Nydegger & Seeley

[57] ABSTRACT

A flake-based pigment is provided having improved specular reflectance characteristics in the visible wavelength range. The flake-based pigment has a plurality of core flake sections each formed of a central reflector layer and dielectric support layers on opposing sides of the reflector layer. The resulting core flake section is a very thin three-layered structure that exhibits a uniaxial compressive strength much greater than a corresponding uniaxial tensile strength. This structure provides the benefits of rigidity and brittle fracture during manufacturing and application processes, which ultimately provides favorable planar and specular reflectance characteristics for the pigment in the visible wavelength range. A variety of outer coating layers can be formed around the core flake sections, such as various dielectric and absorber layers having thicknesses dependent upon the desired optical characteristics of the pigment.

72 Claims, 6 Drawing Sheets

U.S. PATENT DOCUMENTS

| | | | |
|---|---|---|---|
| 3,622,473 | 11/1971 | Ohta et al. | 205/50 |
| 3,926,659 | 12/1975 | Bernhard et al. | 106/418 |
| 3,949,139 | 4/1976 | Dunning et al. | 428/328 |
| 3,962,397 | 6/1976 | Narui et al. | 264/144 |
| 3,988,494 | 10/1976 | McAdow | 428/328 |
| 4,116,710 | 9/1978 | Heikel | 106/404 |
| 4,168,983 | 9/1979 | Vittands et al. | 160/14.12 |
| 4,213,886 | 7/1980 | Turner | 524/850 |
| 4,309,075 | 1/1982 | Apfel et al. | 350/164 |
| 4,321,087 | 3/1982 | Levine et al. | 75/356 |
| 4,434,010 | 2/1984 | Ash | 106/415 |
| 4,552,593 | 11/1985 | Ostertag | 106/412 |
| 4,629,512 | 12/1986 | Kondis | 106/404 |
| 4,705,300 | 11/1987 | Berning et al. | 283/91 |
| 4,705,356 | 11/1987 | Berning et al. | 350/166 |
| 4,721,217 | 1/1988 | Phillips et al. | 215/230 |
| 4,756,771 | 7/1988 | Brodalla et al. | 148/244 |
| 4,838,648 | 6/1989 | Phillips et al. | 350/166 |
| 4,851,095 | 7/1989 | Scobey et al. | 204/192.12 |
| 4,978,394 | 12/1990 | Ostertag et al. | 106/404 |
| 5,009,486 | 4/1991 | Dobrowolski et al. | 350/164 |
| 5,059,245 | 10/1991 | Phillips et al. | 106/22 |
| 5,084,351 | 1/1992 | Phillips et al. | 428/411.1 |
| 5,116,664 | 5/1992 | Kimura et al. | 428/216 |
| 5,135,812 | 8/1992 | Phillips et al. | 428/403 |
| 5,171,363 | 12/1992 | Phillips et al. | 106/22 R |
| 5,190,807 | 3/1993 | Kimock et al. | 428/216 |
| 5,198,042 | 3/1993 | Masumoto et al. | 148/403 |
| 5,225,057 | 7/1993 | LeFebvre et al. | 204/192.13 |
| 5,278,590 | 1/1994 | Phillips et al. | 359/589 |
| 5,279,657 | 1/1994 | Phillips et al. | 106/22 R |
| 5,332,767 | 7/1994 | Reisser et al. | 523/209 |
| 5,356,471 | 10/1994 | Reynders | 106/489 |
| 5,364,467 | 11/1994 | Schmid et al. | 106/404 |
| 5,378,527 | 1/1995 | Nakanishi et al. | 428/216 |
| 5,549,774 | 8/1996 | Miekka et al. | 156/209 |
| 5,571,624 | 11/1996 | Phillips et al. | 428/403 |
| 5,573,584 | 11/1996 | Ostertag et al. | 106/417 |
| 5,593,773 | 1/1997 | McKay et al. | 428/328 |
| 5,607,504 | 3/1997 | Schmid et al. | 106/403 |
| 5,624,076 | 4/1997 | Miekka et al. | 241/3 |
| 5,624,486 | 4/1997 | Schmid et al. | 106/404 |
| 5,629,068 | 5/1997 | Miekka et al. | 428/148 |
| 5,648,165 | 7/1997 | Phillips et al. | 428/346 |
| 5,672,410 | 9/1997 | Miekka et al. | 428/148 |
| 5,763,086 | 6/1998 | Schmid et al. | 106/403 |
| 5,766,334 | 6/1998 | Hashizume et al. | 106/403 |
| 5,766,335 | 6/1998 | Bujard et al. | 428/404 |
| 5,790,304 | 8/1998 | Sanders et al. | 359/361 |
| 5,830,567 | 11/1998 | Panush | 428/324 |
| 5,858,078 | 1/1999 | Andes et al. | 106/437 |
| 5,877,895 | 3/1999 | Shaw et al. | 359/588 |
| 6,013,370 | 1/2000 | Coulter et al. | 428/403 |

OTHER PUBLICATIONS

Teer, Reactive Magnetron Sputter Barrel Ion Plating, Conference Proceedings IPAT91, pp. 303–308, Brussels, Belgium. (no date).

Minolta Manual for Precise Color Communication: Color Control From Feeling to Instrumentation, pp. 18, 20, 22, 23, 46, 47, 48 and 49. (no date).

The R.D. Mathis Company Manual for Thin Film Evaporation Source Reference, Long Beach, CA. (no date).

The Mearl Corporation brochure for Mearl Iridescent Film, Peekskill, New York. (no date).

McKiernan et al., Luminescence and Laser Action of Coumarin Dyes Doped in Silicate and Aluminosilicate Glasses Prepared by the Sol–Gel Technique, Journal of Inorganic Organometallic Polymers, vol. 1, No. 1, 87–103, 1991. (no month).

Zink et al., Optical Probes and Properties of Aluminosilicate Glasses Prepared by the Sol–Gel Method, Polymer Material Science and Engineering, 61, 204–208, 1989. (no month).

Callister Jr., Materials Science and Engineering: An Introduction, John Wiley & Sons, Inc., 91–112, 1985. (no month).

Barrett et al., The Principles of Engineering Materials, Prentice–Hall, Inc., 282–290, 1973. (no month).

*Thin Film Evaporation Source Reference*, R.D. Mathis Company. (no date).

Greiwe K., Coloured Aluminium Pigments, Eckart–Werke Werk Güntersthal, 4th Nürnerg Congress, Paper 6, 1–7. (no date).

BRIGHT METAL FLAKE BASED PIGMENTS

BACKGROUND OF THE INVENTION

1. The Field of the Invention

The present invention relates generally to metal flake pigments. More specifically, the present invention relates to metal flake pigments having improved specular reflectance.

2. The Relevant Technology

Pigments are generally used to contribute to the optical and other properties of applications such as coatings, inks, extrusions, paints, finishes, glass, ceramics and cosmetics. Many varieties of pigments exist, some of which are metal flake based. These metal flakes comprise a thin film metal layer for improving the lustre, sparkle, shine, absorption, hiding and/or reflective properties of the application. The optical performance of the pigments, however, are duly constrained by the inherent limitations of each metal flake therein.

In general, it is known that for the application to achieve the greatest specular reflectance across visible wavelengths (300–800 nm), metal flakes should individually lay as flat as possible. As a collection of numerous flakes, the greatest reflectance, and hence greatest brightness, occurs when the flakes are collectively planar oriented to expose the greatest amount of surface area of the metallic flakes to the incident light and reflect as much of that light as possible.

A major factor, however, affecting those reflectance characteristics is the size or dimensions of the flake as the flake is used in a particular application. For example, if the flakes are thick, a plurality of thick flakes combined together in an application are prevented from lying together in a generally flat or horizontal singular plane because adjacent flakes cannot easily overlap each other due to their thickness. As a result, many flakes are adversely caused to be oriented in a substantially vertical manner and the plurality of flakes are formed into a radically non-planar layer. Incident light then exposed upon the non-planar layer is subject to extreme scatter and non-specular reflection. Thus, the favorable reflective properties of the application are diminished by thick flakes. To a lesser extent, thick flakes frequently cause other difficulties such as the clogging of automatic-spray paint guns during painting applications.

However, it is also well known that as the thicknesses of the flakes is reduced, the point is reached where the flakes become so flimsy (non-rigid, flaccid) that they begin to curl and/or wrinkle. This decreases favorable planarity and reflective properties because incident light exposed upon the flakes is subject to scatter and non-specular reflection. Additionally, if the flakes are too thin when applied onto a surface during applicational use, the flakes will assume any microscopic defects in the contour of that surface. For example, if that contour is rough, the flakes will correspondingly be rough or non-planar. Again, disfavored planarity and reflective properties result because incident light exposed on the surface is subject to scatter and non-specular reflection.

Some manufacturing processes form flakes from a singular, larger sheet or film of metal which is "fractured" by well known means into smaller, flake-sized particles. Two types of fracture may result, "ductile" or "brittle." Ductile fractures cause the metal to undergo substantial plastic deformation near the vicinity of fracture before fracture occurs. This deformation causes numerous malformed regions having disfavorable planar characteristics to appear. As before, these malformed regions, such as regions having curled or wrinkled metal, disadvantageously tend to scatter and diffuse incident light exposed thereupon. Brittle fractures, on the other hand, tend to cause little or no plastic deformation of the metal before the fracture occurs which enables the produced metal flake to maintain, as much as possible, the original planarity of the larger metal sheet. Consequently, it is desirable that brittle fracture occur during manufacturing.

However, brittle fracture does not occur with most metals having high reflectivity. In fact, brittle fracture is only likely to occur with materials having a large compressive strength as compared to its corresponding tensile strength. This is because the internal bond strength distributed throughout a material is composed of tensile and compressive components. The tensile strength compensates for forces out of the plane of the material and the compressive strength is related to forces in the plane. Thus, similar compressive and tensile strengths will allow ductile deformations since the relative strength into and out of the plane is equivalent. In contrast, brittle deformation occurs when the compressive strength is greater than the tensile strength and the material strength is directed into the plane, not out of the plane. Consequently, a high compressive strength relative to tensile strength results in bond rupture and material cracking when a force is applied. Thus, aluminum, for example, which has a tensile strength of about 13–24 $lb/in^2$ and a compressive strength of about 13–24 $lb/in^2$, would most likely undergo a ductile fracture under a uniaxial stress which would cause the aluminum to exhibit disfavored reflective characteristics. Moreover, once the aluminum is bent or deformed, as would occur with ductile fracture, the aluminum remains deformed and the disfavored reflective characteristics would persist. Consequently, it is difficult to manufacture metal flakes, such as aluminum, without malformations that reduce reflectance.

As is well known, fracture mechanics are not only important for metal flakes during the manufacturing process, but are as equally important during use. For example, applicational processes, such as the drying of a paint or ink solvent, also induce stresses on the flake. These stresses, caused by surface tension, again cause the flake to undergo fracture or malformation. Since brittle fracture of the flake during the applicational process also tends to produce smaller flakes that maintain much of the original planarity of the larger flake, instead of curled or deformed flakes, flake planarity and reflective properties are improved. Thus, flake brittleness is a characteristic not only preferred during the manufacturing process but also preferred during the applicational use. Accordingly, the prior art has attempted to produce thin, rigid and brittle flakes by facilitating both the manufacturing thereof and the reflective properties of the application.

Yet all prior solutions have involved compromises. For example, in U.S. Pat. No. 5,198,042, entitled "Aluminum Alloy Powders for Coating Materials and Materials Containing the Alloy Powders," it is taught to alloy the metal flake with other materials and metals to reduce the adverse curling, wrinkling and malleability of thin flakes. Alloying, however, dilutes the reflectance properties of the flake.

In U.S. Pat. No. 4,213,886, entitled "Treatment of Aluminum Flake to Improve Appearance of Coating Compositions," a surface bound species that pulls the flake flat in a coating resin is disclosed. This method, however, requires chemical tailoring of the flake and the resin in order achieve chemical compatibility with the species. Such compatibility is difficult and has not proved to be practical.

In U.S. Pat. No. 4,629,512, entitled "Leafing Aluminum Pigments of Improved Quality," flakes are floated on a resin coating. Adversely, this method submits the flake to durability attacks because the flake is unprotected. Such attacks primarily include corrosion which not only corrodes the flake but tends to give the application a mottled or discolored appearance. Additionally, if this method were used in conjunction with another resinous application, such as a clear overcoat paint, the overcoat itself would tend to disfavorably disrupt the planar orientation of the flake because of solvent penetration. Again, reflectance properties are decreased.

In U.S. Pat. No. 5,593,773, entitled "Metal Powder Pigment," pre-cracked flakes are disclosed having such a small aspect ratio that malformation of the flake is essentially impossible. A shrinking aspect ratio, however, also correspondingly shrinks the inherent reflectance capability of the flake. This is because, as the aspect ratio becomes smaller, any non-planar flake orientation during applicational use exposes such a small surface area of the flake to the incident light that reflection of that light is minimal. Other prior art proposals, such as encapsulating a metal flake in a metallic coating, also decrease the flake aspect ratio which adversely eliminates the ability of the flake to reflect incident light.

In U.S. Pat. No. 3,622,473, entitled "Method of Providing Aluminum Surfaces with Coatings," flake rigidity is increased by oxidizing the reflector of the flake to form a rigid, outer oxide layer. Whenever an oxide is used, however, the inherent reflectance properties of the flake are decreased. Additionally, oxides are typically formed at defect sites on the flakes which then tend to prevent a uniform application across the surface of the flake. This non-uniformity introduces a reduction in reflectance and can also cause a mottled applicational appearance.

Various attempts have been made to improve flake rigidity by applying singular or multiple layer coatings about the surfaces thereof Thus far, the singular layer coatings have been so thick that reflective properties are detrimentally damaged because the coatings have greatly contributed to the scatter of light. The multiple layer coatings have induced even more scatter and adversely caused light to diffuse at the boundaries between various layers. In addition, all coatings thus far have essentially been organic, and inherent within the crystalline structure of these organic coatings is a natural limitation as to how thinly applied the coatings can be manufactured and still provide structural rigidity to a flimsily thin metal flake. Disadvantageously, the natural thickness limitation is still so large that other applicational processes remain burdened by this thickness. Such processes include spraying the flakes through an automatic-spray paint gun. Moreover, organic coatings when applicationally used in a solvent are eventually caused to lose structural rigidity because of dissolution related effects.

Although some reflective coatings exist that are rigid and facilitate brittle fracture, the coatings are unlike most of the other prior art because they do not even use a metal flake. In U.S. Pat. No. 4,309,075, entitled "Multilayer Mirror with Maximum Reflectance," for example, multiple layer coatings are taught that merely simulate a metal flake and its reflective properties. These coatings, known as "high-low" coatings because of their alternating layers of high and low indices of refraction, are used to create a reflector that simulates the reflective properties of a metal flake. Another example is described in U.S. Pat. No. 3,123,490 issued to Bolomey, in which a layer of ZnS is coated on a top and bottom thereof with $MgF_2$. Although rigid and subject to brittle fracture, this structure is typically very thick (about 215 nm) and cannot be used in many applications requiring thin flakes. Moreover, it is often necessary to have numerous layers of alternating high-low coatings to achieve simulation of the metal flake. But as thicknesses and layers increase, manufacturing complexities and economic burdens correspondingly increase.

Accordingly, it is desirous to find alternatives for inexpensively producing a thin, rigid and brittle metal flake having improved reflective characteristics thereby improving reflectance of metal flake-based pigments.

SUMMARY AND OBJECTS OF THE INVENTION

It is an object of the present invention to provide an improved metal flake-based pigment containing substantially rigid thin metal flakes with good specular reflectance characteristics in the visible wavelength range of about 300 nm to about 800 nm.

It is a further object of the present invention to provide an improved metal flake-based pigment having thin metal flakes therein possessing brittle fracture properties to thereby afford improved reflectance characteristics during use.

It is yet another object of the present invention to provide a relatively cost-effective process of producing an improved metal flake-based pigment having thin, rigid and brittle metal flakes therein.

It is still another object of the present invention to provide an improved metal flake-based pigment containing flakes with a large aspect ratio.

In accordance with the invention as embodied and broadly described herein, the foregoing and other objectives are achieved by providing a flake-based pigment having a plurality of core flake sections each formed of a central reflector layer and at least one dielectric support layer on a side of the reflector layer. The core flake section is a very thin structure that exhibits a uniaxial compressive strength much greater than a corresponding uniaxial tensile strength. This structure provides the benefits of rigidity and brittle fracture during manufacturing and application processes, which ultimately provides favorable planar and specular reflectance characteristics for the pigment in the visible wavelength range. The favorable properties of rigidity and brittleness allow easy fracture of a formed core flake film into small flakes during the manufacturing process without the flakes becoming curled or wrinkled. The core flake sections also have a large aspect ratio, allowing for favorable reflection of substantial amounts of incident light during applicational use.

One or more coating layers can be formed around the fabricated core flake sections according to various embodiments of the invention. Such coating layers can include various dielectric, absorber, and/or other optical coatings having thicknesses dependent upon the desired optical characteristics of the pigment. The coating layers provide particular characteristics to the pigment, such as color shift, color enhancement, magnetic properties, solar absorption properties, etc.

In a method of fabricating a highly reflective flake-based pigment according to the present invention, a first dielectric support layer is formed on an upper surface of a web material, and a reflector layer is formed on the first dielectric support layer. A second dielectric support layer can be formed on the reflector layer to complete a core flake film having substantial rigidity so as to provide high reflectance to the pigment. The core flake film is then removed from the web material in order to produce a plurality of core flake sections. One or more coating layers are then formed around the core flake sections as desired.

Other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered limiting of its scope, the invention in its presently understood best mode for making and using the same will be described and explained with additional specificity and detail through the use of the accompanying drawings in which.

DETAILED DESCRIPTION OF THE INVENTION

Figure 1:
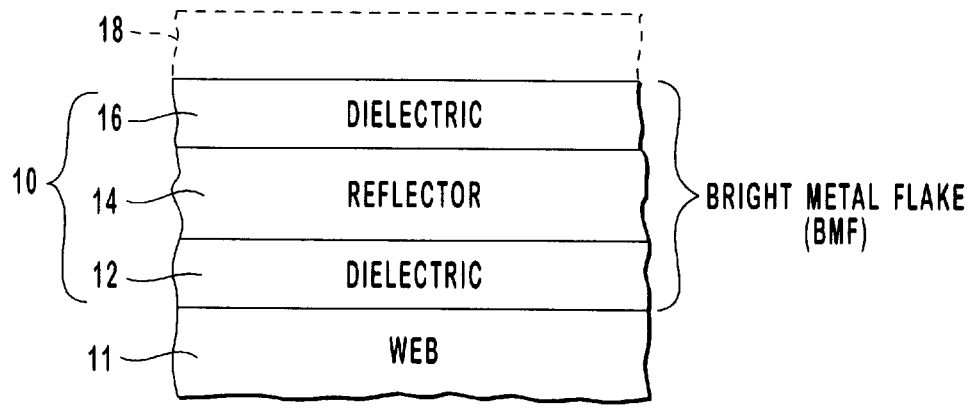
FIG. 1 is a schematic cross-sectional view of a bright metal flake film in accordance with the present invention.

The present invention is directed to metal flake-based pigments having improved specular reflectance characteristics in the wavelength range of about 300 to about 800 nm. It is a feature of the present invention to provide a core portion of the pigment flakes with a thin reflector layer, typically metal, having dielectric support layers disposed on one or both opposing planar surfaces of the reflector layer. The dielectric layers provide rigid support and brittle fracture characteristics for the metal reflector layer. It is a feature of the invention to surround the core portions with one or more dielectric, absorbing, and/or other optical layers, to yield a plurality of pigment particles.

The metal flake-based pigments of the invention having thin, rigid and brittle metal flakes therein can be produced by a relatively cost-effective process. The flake-based pigments are useful in a variety of applications such as coating compositions, inks, extrusions, paints, electrostatic coatings, glass, ceramics and cosmetics. The brittle fracture properties of the thin metal flakes in the pigments provide improved reflectance characteristics during use of the pigments.

Referring to the drawings, wherein like structures are provided with like reference designations, the drawings only show the structures necessary to understand the present invention.

FIG. 1 depicts a flake-based pigment film for making a highly reflective flake-based pigment of the present invention. The flake-based pigment film includes a core flake section 10 which is formed on a web 11 of a flexible material by conventional deposition processes, as discussed in further detail below. The core flake section 10 includes a central reflector layer 14, with at least one support layer 12 formed on one side of reflector layer 14. As shown in FIG. 1, a second support layer 16 can be formed on the opposing side of reflector layer 14 to produce a three-layered core structure.

FIG. 1 also shows that one or more thin film optical layers 18 (shown in phantom) can be optionally formed on core flake section 10 if desired, as long as the functionality of the core flake section remains unchanged. For example various dielectric, absorber, and/or other optical coatings having thicknesses dependent upon the desired optical characteristics of the pigment can be formed on one or both sides of core flake section 10 prior to removal as flakes from web 11. These flakes can then be used in the production of optical paint flakes and in forming replicated optical coatings, or may be subjected to further coating processes to produce additional optical layers around the flakes.

For purposes of convenience and brevity, the core flake section of the present invention shall sometimes be referred as a "bright metal flake" (BMF). This term is not meant to exclude reflector layers formed of a material other than a pure metal. The presently preferred core flake section of the invention is further described in detail in a copending application entitled "Bright Metal Flake" (U.S. Ser. No. 09/005,064, filed Jan. 9, 1998) now U.S. Pat. No. 6,013,370, which is incorporated herein by reference.

The materials for reflector layer 14 are selected so as to have the reflective characteristics suitable for the intended use of the pigment. The presently preferred reflector material is aluminum, which has good reflectance characteristics while remaining inexpensive and easy to form into a thin layer. It will be appreciated in view of the teachings herein, however, that other reflective materials may be used in place of aluminum. For example, copper, silver, gold, platinum, palladium, nickel, cobalt, niobium, chromium, tin, and combinations or alloys of these or other metals can be used as reflective materials. Other useful reflective materials include, but are not limited to, the transition and lanthanide metals and combinations thereof; as well as metal carbides, metal oxides, metal nitrides, metal sulfides, combinations thereof, or mixtures of metals and one or more of these materials.

The thickness of reflector layer 14 can be in a range from about 40 nm to about 150 nm, although this range should not be taken as restrictive. For example, the lower limit of about 40 nm is preferably selected for an aluminum reflector layer so that the aluminum is not transparent. Other reflector materials may justify higher or lower minimum thicknesses in order to obtain a non-transparent thickness. The upper limit of about 150 nm, in this embodiment, is selected primarily to obtain a high aspect ratio of diameter to thickness in the final pigment. Even greater thicknesses could be acceptable for some purposes.

In a more preferred range, the thickness of the reflector layer is from about 80 nm to about 150 nm, with a most preferred thickness of about 100 nm. With respect to the lower limit of about 80 nm, this limit is selected to obtain a substantially opaque thickness for an aluminum layer for the purpose of facilitating reflectance. Other reflector materials may justify higher or lower minimum thicknesses in order to obtain opaque thicknesses. The upper limit of about 150 nm is still selected to maintain a high aspect ratio in the final pigment. It is contemplated that the reflector thickness selected, however, will be flimsy if unsupported, having adverse properties such as curling, wrinkling and malleability of the layer. Thus, support layers 12 and 16 are formed on either or both sides of reflector layer 14.

Preferably, the support layers are composed of dielectric materials. The dielectric materials of the support layers are preferably inorganic, since inorganic dielectric materials have been found to have good characteristics of brittleness and rigidity. For example, support layers 12 and 16 can be formed of dielectric materials composed of metal fluorides, metal oxides, metal sulfides, metal nitrides, metal carbides, and combinations thereof. Examples of suitable dielectric materials include magnesium fluoride, silicon monoxide, silicon dioxide, aluminum oxide, titanium dioxide, zinc sulfide, combinations thereof, and the like. These materials are readily available and easily applied. It will be appreciated from the teachings herein, however, that any support material providing the functionality described herein and capable of acting as a rigid layer with glass-like qualities would be an acceptable substitute for one of these materials. Advantageously, the dielectric materials will also protect against the adverse effects of solvents during applicational use.

The thickness of each of the support layers can be from about 10 nm to about 200 nm, preferably from about 50 nm to about 200 nm, with a most preferred thickness of about 100 nm. The range of coating thicknesses for the support layers is subject to variation based upon the actual reflector layer used and the support coating material chosen. With an aluminum reflector layer and either silicon dioxide or magnesium fluoride for the support layers, the lower thickness limit of about 50 nm is selected based upon the strength of the coating, beyond which, when smaller, will not be strong enough to maintain structural integrity (and hence flake rigidity), under the stress and strain imposed by a flexing aluminum reflector layer. The upper limit of about 200 nm is selected based upon the observation that color interference between dielectric support layers commences at thicknesses beyond 200 nm. In situations where color interference is useful, thicker support layers may be used.

From the foregoing, it will be appreciated that the presently preferred core flake section 10 is only about 300 nm thick: about 100 nm for each of the two support layers and about 100 nm for the reflector layer. Despite this exceedingly small flake thickness, it has been surprisingly discovered that a flake having this three-layered structure has sufficient rigidity for use as a highly reflective pigment, primarily because of the inherent uniaxial strengths of the support dielectrics. For example, a dielectric support coating of silicon dioxide, which has a uniaxial compressive strength of about 160,000 (lb/in$^2$) and a uniaxial tensile strength of about 7000 (lb/in$^2$), prevents the internal reflector layer from flexing, bowing or otherwise deforming.

Aluminum has a tensile strength approximately equal to its compressive strength. Yet when the aluminum layer is layered with the supporting dielectrics according to the present invention, the uniaxial compressive strength (lb/in$^2$) of the core flake section is surprisingly about 8 times greater than the uniaxial tensile strength (lb/in$^2$). This surprising result is empirically supported under the well known theory of brittle fracture, known as Griffith's theory. This substantial difference in strengths beneficially transforms an aluminum layer tending to fracture by ductility into a layer tending to fracture by brittleness. Brittle fracture characteristics then advantageously serve to facilitate the separation of a plurality of metal flakes from a larger metal film during manufacturing processes, and to facilitate the fracture of individual metal flakes as stresses are imposed during use.

In a preferred brittleness range, the reflector layer is satisfactorily strengthened by the support layers when the uniaxial compressive strength of the core flake section is about 6 times or higher than the uniaxial tensile strength. Although the core flake section can be strengthened in amounts less than about 6 times the tensile strength, the flake then tends to exhibit adverse fracture characteristics similar to those of ductile fractures. It should be appreciated that although the foregoing rigidity and brittleness was achieved in a two-sided support coating, it is even contemplated that the reflector layer can also be coated upon a single side and still achieve favorable properties during manufacturing and use. The single layer coating, however, will typically require stress balancing by means well known to those skilled in the art to prevent curling of the flake. The two sided coating, however, is the preferred embodiment for the core flake section to satisfactorily improve flake rigidity and to promote symmetry useful during manufacturing processes.

The core flake sections of the present invention are not of a uniform shape. Nevertheless, for purposes of brevity, the flake will be referred to as having a "diameter." In a presently preferred embodiment, the diameter of the core flake sections are in a range of about 1–50 microns, and preferably a range of about 5–25 microns. The aspect ratio of flake diameter to flake thickness for the core flake sections of the present invention is in a range of about 6.5–625, and preferably a range of about 50–250. As is well known, the greater the aspect ratio, the flatter the core flake sections will lie, hence increasing reflectance. Since many prior pigments and/or flakes have an optimal aspect ratio of only about 15, it should be apparent that the aspect ratio of the present invention will inherently yield substantially improved reflectance properties.

In general, the method for fabricating the flake-based pigment of the invention first involves the process of manufacturing core flake section 10. A first dielectric support layer 12 is formed on an upper surface of web 11 as shown in FIG. 1, and a reflector layer 14 is formed on support layer 12, by conventional deposition processes such as physical vapor deposition (PVD). The web 11 is made of a flexible material which can be employed in a conventional roll coater apparatus. A second dielectric support layer 16 can then be formed on reflector layer 14 by a deposition process to complete a core flake film having substantial rigidity so as to provide high reflectance. The core flake film is then removed from web 11 in order to produce a plurality of core flake sections 10 composed of bright metal flake (BMF). Thereafter, one or more thin film coating layers are formed around core flake sections 10 to produce various pigment products, as discussed in further detail below.

The deposition of the support layers is preferably accomplished by a conventional vapor deposition process such that the support layer will crack under the stresses imposed as the support layer transitions from the vapor phase into the solid phase. The deposited reflector layer takes on the characteristics of the underlying cracked support layer as does the remaining support layer deposited on the reflector layer. In this manner, the two support layers bolster an extremely flimsy and thin reflector film into a rigid reflector film possessing characteristics tending to fracture the reflector along the cracks of the support layers in a brittle, instead of ductile, manner. Thereafter, as the flexible web is removed, either by dissolution in a preselected liquid or by means of release agents, both well known in the art, a plurality of core flake sections are fractured out according to the cracks of the support layers. This type of manufacturing technique is similar to that more fully described in U.S. Pat. No. 5,135, 812, issued on Aug. 4, 1992 to Phillips et al., entitled "Optically Variable Thin Film Flake and Collection of the Same" which is expressly incorporated herein by reference.

Once manufactured, each individual core flake section possesses exceptional planar characteristics which allows each flake section to be extremely flat and smooth even in the vicinity of the fracture. In turn, this flat and smooth feature allows the further deposition of thin film coating layers without compounding surface deformities, unlike prior pigments having rough or non-planar flake sections.

Thereafter, the core flake sections are ground into sizes appropriate for the desired application. Once ground, various additional thin film coating layers are deposited on the core flake sections, depending upon the desired optical performance of the pigment as it is used in an application, to form the flake-based pigments of the present invention. It should be noted that pigment flakes containing inorganic dielectrics can be ground to size at any stage during manufacture, whereas pigment flakes containing organic dielectrics need to be ground to final application size before the organic dielectrics are applied.

Various alternative embodiments of the flake-based pigment of the invention having a core portion of a bright metal flake will be discussed in detail as follows.

Figure 2A:
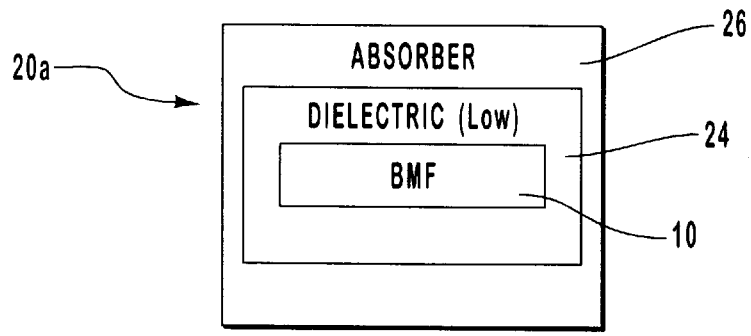
FIGS. 2A and 2B are schematic cross-sectional views of flake-based pigment particles according to alternative embodiments of the present invention.

FIG. 2A shows a cross-sectional view of a flake-based pigment particle 20a according to one embodiment of the present invention, which has a core flake section 10 composed of a BMF having substantial rigidity. The core flake section 10 includes a reflector layer and at least one support layer on a side of the reflector layer as discussed above. A first dielectric coating 24 is formed to substantially surround or encapsulate core flake section 10. The dielectric coating 24 is composed of a material having a "low" index of refraction, which is defined herein as an index of refraction of about 1.65 or less. Suitable low index materials for dielectric coating 24 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like. The dielectric coating 24 is preferably formed to have an optical thickness of a plurality of halfwaves at a particular design wavelength, with a physical thickness in a range from about 50 nm to about 800 nm, preferably from about 72 nm to about 760 nm, and more preferably from about 200 nm to about 600 nm.

A first absorber coating 26 is formed to substantially surround or encapsulate dielectric coating 24. Suitable materials for absorber coating 26 include all metals having uniform absorption or selective absorption in the visible spectrum. Examples of such metals include chromium, nickel, iron, titanium, aluminum, tungsten, molybdenum, niobium, combinations or alloys thereof, such as Inconel (Ni—Cr—Fe), metals mixed in a dielectric matrix, or other substances that are capable of acting as a uniform or selective absorber in the visible spectrum. The absorber coating 26 is preferably formed to have a thickness in a range from about 2 nm to about 80 nm, and more preferably from about 3 nm to about 30 nm. It should be appreciated, however, that still other thicknesses for the dielectric and absorber coating layers are contemplated for altering the optical performance of the pigment.

It should be understood that the absorber coating at thin thicknesses does not need to be continuous to still work as an optical absorber. For example, a plurality of islands or dots of absorber material can suffice as an absorber.

The dielectric coating 24 and absorber coating 26 are formed around core flake section 10 of pigment particle 20a by conventional coating processes. For example, suitable preferred methods for forming the dielectric coating include, but are not limited to, vacuum vapor deposition, sol-gel hydrolysis, chemical vapor deposition (CVD) in a fluidized bed, electrochemical deposition, and polymerizing an organic monomer on the surface of the flake. Suitable methods for forming the absorber coating include, but are not limited to, vapor deposition, sputtering onto a mechanically vibrating bed of particles, decomposition by pyrolysis of metal-organo compounds, and a CVD fluidized bed. If no further grinding is carried out, these methods result in an encapsulated core flake section with dielectric and absorber materials therearound. Various combinations of the above coating processes may be utilized during manufacture of pigment flakes with multiple coatings therearound.

Figure 2B:
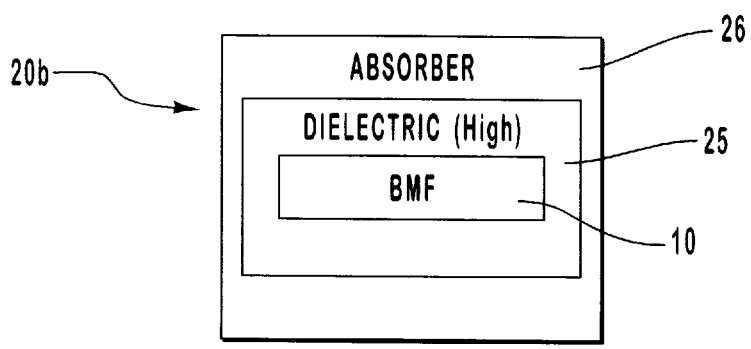

FIG. 2B is a cross-sectional view of a flake-based pigment particle 20b according to an alternative embodiment of the present invention. The pigment particle 20b includes similar components as pigment particle 20a discussed above, including a core flake section 10 composed of a BMF. A first dielectric coating 25 is formed to substantially surround or encapsulate core flake section 10. The dielectric coating 25 is composed of a material having a "high" index of refraction, which is defined herein as an index of refraction of greater than about 1.65. Suitable high index materials for dielectric coating 25 include zinc sulfide (ZnS), zinc oxide (ZnO), zirconium oxide ($ZrO_2$), titanium dioxide ($TiO_2$), carbon, indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II) diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like. The dielectric coating 25 is preferably formed to have a physical thickness in a range from about 50 nm to about 800 nm, and more preferably from about 72 nm to about 760 nm.

An absorber coating 26 is formed to substantially surround or encapsulate dielectric coating 25. The absorber coating 26 can be formed of the same materials and in the same thickness range as discussed above with respect to particle 20a. The dielectric coating 25 and absorber coating 26 can be formed around core flake section 10 by the same conventional coating processes as discussed above with respect to particle 20a.

Figure 3A:
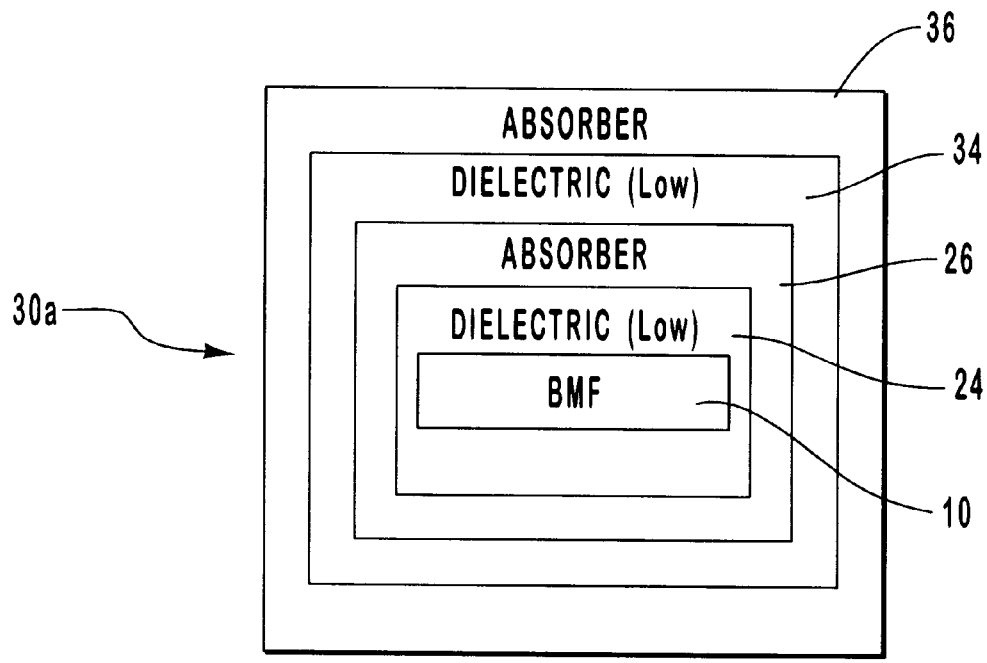
FIGS. 3A–3D are schematic cross-sectional views of flake-based pigment particles according to further alternative embodiments of the present invention.

FIGS. 3A–3D are cross-sectional views of flake-based pigment particles according to further alternative embodiments of the present invention. As shown in FIG. 3A, a pigment particle 30a has an interior structure of the same components as discussed above for particle 20a. These include a core flake section 10 composed of a BMF, a first dielectric coating 24 of a low index material formed around core flake section 10, and a first absorber coating 26 formed around dielectric coating 24. The pigment particle 30a additionally includes a second dielectric coating 34 of a low index material formed around absorber coating 26, and a second absorber coating 36 formed around dielectric coating 34. The first and second dielectric coatings have an index of refraction of about 1.65 or less. The additional dielectric and absorber coatings can be formed of the same materials and in the same thickness ranges as discussed above with respect to particle 20a, by the above conventional coating processes.

Figure 3B:
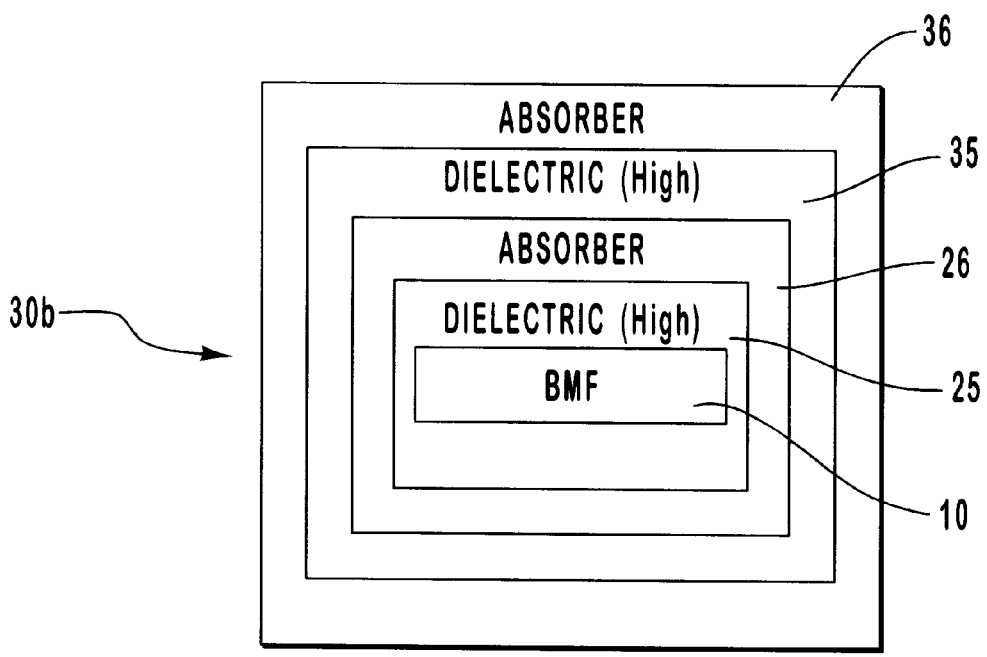

FIG. 3B depicts a pigment particle 30b according to an alternative embodiment of the invention. The pigment particle 30b has an interior structure of the same components as discussed above for particle 20b. These include a core flake section 10 composed of a BMF, a first dielectric coating 25 of a high index material formed around core flake section 10, and a first absorber coating 26 formed around dielectric coating 25. The pigment particle 30b additionally includes a second dielectric coating 35 of a high index material formed around absorber coating 26, and a second absorber coating 36 formed around dielectric coating 35. The first and second dielectric coatings have an index of refraction of greater than about 1.65.

Figure 3C:
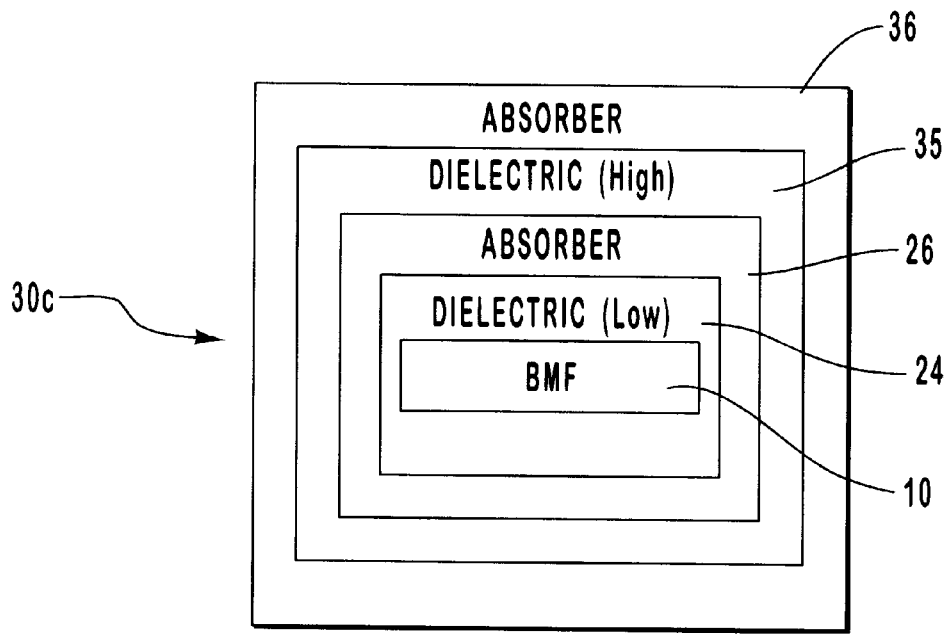

A pigment particle 30c according to a further alternative embodiment of the invention is depicted in FIG. 3C. The pigment particle 30c has essentially the same structure as particle 30a discussed above, except that a second dielectric coating 35 of a high index material is formed around absorber coating 26. Thus, dielectric coating 24 has an index of refraction of about 1.65 or less, and dielectric coating 35 has an index of refraction of greater than about 1.65.

Figure 3D:
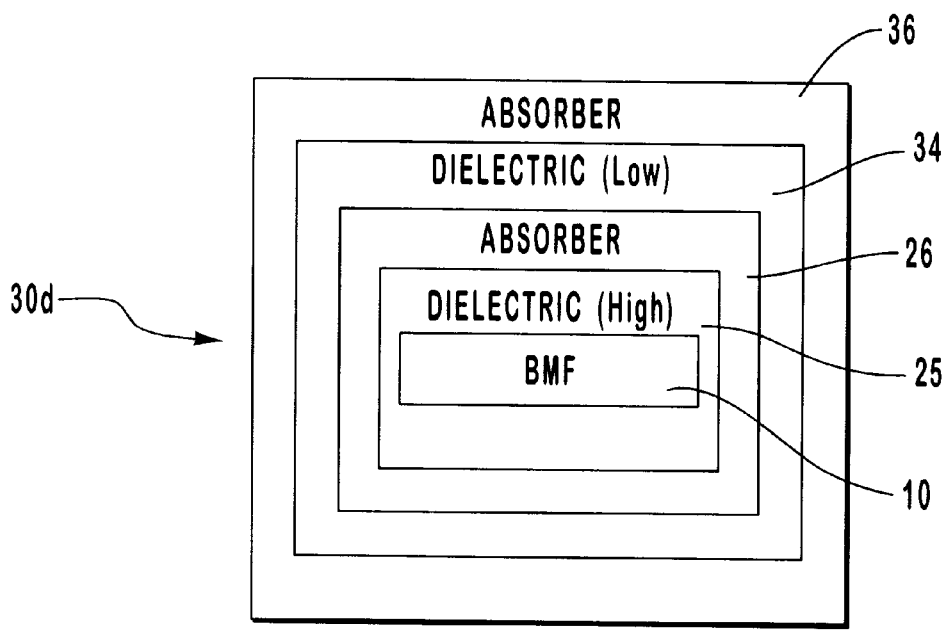

FIG. 3D depicts a pigment particle 30d according to another alternative embodiment of the invention. The pigment particle 30d has essentially the same structure as particle 30b discussed above, except that a second dielectric layer 34 of a low index material is formed around absorber coating 26. Thus, dielectric coating 25 has an index of refraction of greater than about 1.65, and dielectric coating 34 has an index of refraction of about 1.65 or less.

Figure 4A:
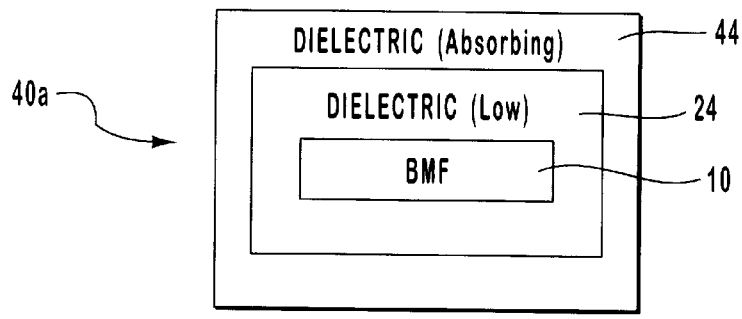
FIGS. 4A and 4B are schematic cross-sectional views of flake-based pigment particles according to other alternative embodiments of the present invention.
Figure 4B:
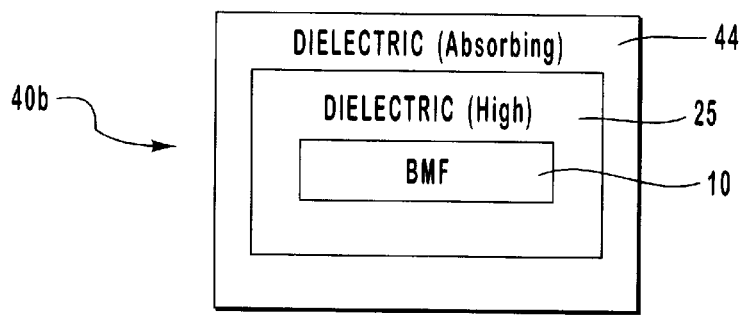

FIGS. 4A and 4B are schematic cross-sectional views of flake-based pigment particles according to other alternative embodiments of the present invention. As shown in FIG. 4A, a pigment particle 40a has an interior structure of the same components as the interior structure of particle 20a in FIG. 2A. These include a core flake section 10 composed of a BMF, and a first dielectric coating 24 of a low index material formed around core flake section 10. In addition, pigment particle 40a includes a second dielectric coating 44 substantially surrounding first dielectric coating 24. The second dielectric coating 44 is composed of an absorbing dielectric material such as an iron oxide (e.g., $Fe_2O_3$), silicon monoxide (SiO), chromium oxide ($Cr_2O_3$), carbon, titanium nitride (TiN), titanium sub-oxide ($TiO_x$, where x is less than 2.0), combinations thereof, and the like.

FIG. 4B depicts a pigment particle 40b with an interior structure of the same components as the interior structure of particle 20b in FIG. 2B. These include a core flake section 10 composed of a BMF, and a first dielectric coating 25 of a high index material formed around core flake section 10. In addition, pigment particle 40b includes a second dielectric coating 44 of an absorbing material substantially surrounding first dielectric coating 25.

Figure 5A:
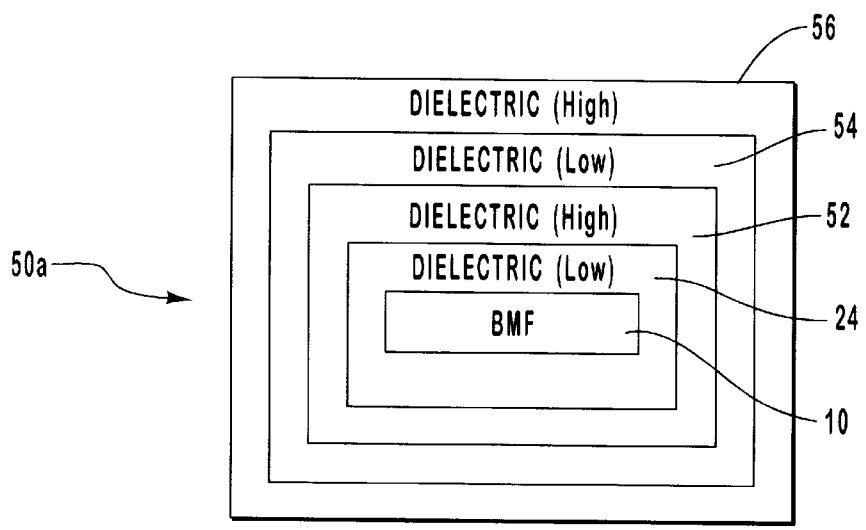
FIGS. 5A and 5B are schematic cross-sectional views of flake-based pigment particles according to further alternative embodiments of the present invention.
Figure 5B:
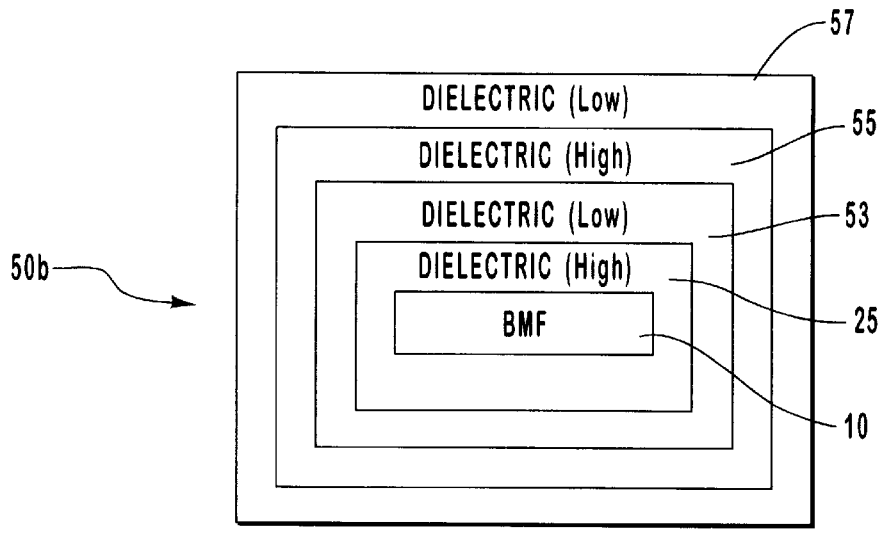

FIGS. 5A and 5B are schematic cross-sectional views of flake-based pigment particles according to additional alternative embodiments of the invention, which are formed with alternating high and low index coatings. As shown in FIG. 5A, a pigment particle 50a has an interior structure of the same components as the interior structure of particle 40a in FIG. 4A. These include a core flake section 10 composed of a BMF, and a first dielectric coating 24 of a low index material formed around core flake section 10. In addition, pigment particle 50a includes a second dielectric coating 52 of a high index material substantially surrounding first dielectric coating 24, a third dielectric coating 54 of a low index material substantially surrounding second dielectric coating 52, and a fourth dielectric coating 56 of a high index material substantially surrounding third dielectric coating 54.

As shown in FIG. 5B, a pigment particle 50b has an interior structure of the same components as the interior structure of particle 40b in FIG. 4A. These include a core flake section 10 composed of a BMF, and a first dielectric coating 25 of a high index material formed around core flake section 10. In addition, pigment particle 50b includes a second dielectric coating 53 of a low index material substantially surrounding first dielectric coating 25, a third dielectric coating 55 of a high index material substantially surrounding second dielectric coating 53, and a fourth dielectric coating 57 of a low index material substantially surrounding third dielectric coating 55.

The above described pigment particle embodiments of the invention (FIGS. 2A–5B) are particularly useful in preparing pigments with color shifting properties, non-shifting color pigments, pigments with color enhancement properties, high reflectance properties, magnetic properties, and colored metallics. For example, use of high index dielectric materials for the coating layers can produce pigments with pure colors, while use of low index dielectric materials can produce pigments with color shifting properties.

Figure 6:
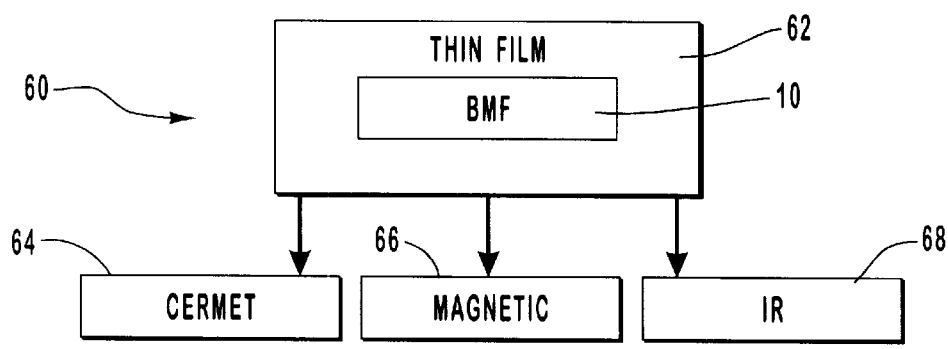
FIG. 6 is a schematic cross-sectional view of a flake-based pigment particle showing other alternative embodiments of the present invention.

FIG. 6 is a cross-sectional view of a flake-based pigment particle 60 showing other alternative embodiments of the invention. The pigment particle 60 includes a core flake section 10 composed of a BMF, and a thin film coating 62 formed on core flake section 10. The thin film coating 62 can be formed of a variety of different materials of one or more layers. The thin film coating 62 is formed to have a thickness of from about 3 nm to about 4000 nm (4 μm), preferably from about 50 nm to about 800 nm, and more preferably from about 200 nm to about 600 nm.

In one embodiment, the thin film coating 62 can be a cermet (ceramic-metal) material 64, which provides selective solar absorption properties to the pigment. In an application of H. Gurev, entitled "Selective Solar Absorber and Structure Incorporating the Same" (Ser. No. 86,076, filed Oct. 18, 1979, now abandoned), materials and approaches for forming cermet materials are exemplified. The foregoing abandoned application is expressly incorporated herein by reference.

In another embodiment, the thin film coating 62 can be at least one layer of a magnetic material 66. The magnetic coating can be used to produce a magnetic color shifting pigment useful in applications such as credit cards, checks, or bar code patterns. One preferred magnetic coating design is a symmetrical application of a cobalt-nickel alloy, with the cobalt and nickel having a ratio by weight of 80% and 20%, respectively, which is deposited about core flake section 10. Further magnetic color shifting coating layers useful for application with core flake section 10 are described in U.S. Pat. No. 4,838,648, expressly incorporated herein by reference.

In a further embodiment, the thin film coating 62 of pigment particle 60 can be composed of at least one layer of an infrared light (IR) reflecting material 68. Suitable IR reflecting materials include ITO, europium oxide ($Eu_2O_3$), vanadium pentoxide ($V_2O_5$), rhenium oxide ($ReO_3$), lanthanum boride ($LaB_6$), combinations thereof, and the like.

Figure 7:
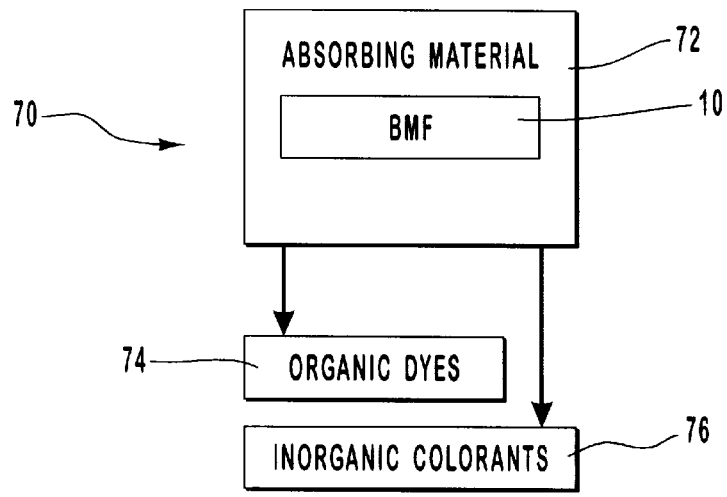
FIG. 7 is a schematic cross-sectional view of a flake-based pigment particle showing further alternative embodiments of the present invention.

FIG. 7 is a cross-sectional view of a flake-based pigment particle 70 showing other alternative embodiments of the invention. The pigment particle 70 includes a core flake section 10 composed of a BMF, and a coating 72 of a radiation absorbing material (e.g., visible or IR radiation) formed on core flake section 10. The coating 72 can be formed of a variety of different absorbing materials in one or more layers. Preferably, coating 72 is formed to have a thickness of from about 3 nm to about 400 nm, and more preferably from about 50 nm to about 200 nm.

In one embodiment, coating 72 can be formed of an organic dye material 74. Examples of suitable organic dyes include copper phthalocyanine, perylene, anthraquinones, and the like; azo dyes and azo metal dyes such as aluminum red RLW, aluminum copper, aluminum bordeaux RL, aluminum fire-red ML, aluminum red GLW, aluminum violet CLW, and the like; as well as combinations or mixtures thereof.

In another embodiment, coating 72 can be formed of aluminum oxide or silicon dioxide applied by a sol-gel process, with organic dyes absorbed into pores of the sol-gel coating or bound to the surface of the coating. Suitable organic dyes used in the sol-gel coating process include those available under the trade designations Aluminiumrot GLW (aluminum red GLW) and Aluminiumviolett CLW (aluminum violet CLW) from the Sandoz Company. Aluminum red GLW is an azo metal complex containing copper, and aluminum violet CLW is a purely organic azo dye. Examples of sol-gel coating techniques useful in the present invention are disclosed in U.S. Pat. No. 4,756,771 to Brodalla (1988); Zink et al., *Optical Probes and Properties of Aluminosilicate Glasses Prepared by the Sol-Gel Method*, Polym. Mater. Sci. Eng., 61, pp. 204–208 (1989); and McKieman et al., *Luminescence and Laser Action of Coumarin Dyes Doped in Silicate and Aluminosilicate Glasses Prepared by the Sol-Gel Technique*, J. Inorg. Organomet. Polym., 1(1), pp. 87–103 (1991); the disclosures of which are incorporated herein by reference.

In a further embodiment, coating 72 can be formed of an inorganic colorant material 76. Suitable inorganic colorants include titanium nitride, chromium nitride, chromium oxide, iron oxide, cobalt-doped alumina, combinations or mixtures thereof, and the like. The organic dyes and inorganic colorants can be used to achieve pigments with bright colors.

Various modifications and combinations of the foregoing embodiments are also considered within the scope of the invention. For example, additional dielectric, absorber, and/or other optical coatings can be formed around each of the above particle embodiments, or on a BMF film prior to flake formation, to yield further desired optical characteristics.

The following examples are given to illustrate the present invention, and are not intended to limit the scope of the invention.

EXAMPLE 1

Several samples of bright metal flake pigments were prepared, each sample containing a plurality of core flake sections in accordance with the present invention. The reflector layers each had a thickness of about 100 nm of aluminum and ranged in diameter from about 1–50 microns. Inorganic dielectric support layers having a thickness in a range of about 100–200 nm were formed on opposing planar surfaces of the reflector layers. The dielectric support layers were formed of either silicon dioxide or magnesium fluoride.

EXAMPLE 2

Figure 8:
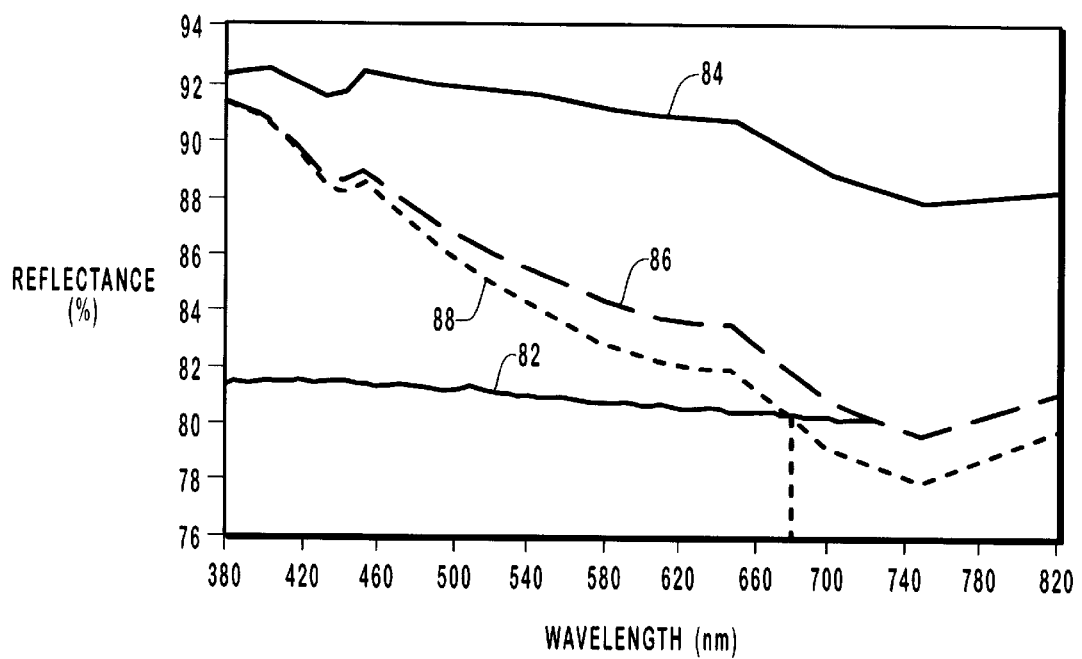
FIG. 8 is a graphical representation of total reflectance with respect to wavelength for various flake-based pigments.

Actual reflectance results obtained as a function of various wavelengths were observed and recorded for the flake-based pigments of Example 1 and for various other flake-based pigments. FIG. 8 is a reflectance-wavelength graph of the total reflectance with respect to wavelength, and shows a reflectance curve 82 for the flake-based pigments of Example 1. The reflectance curve 82 has also been empirically supported by the results obtained from various other measurement devices (not shown) such as ink drawdowns, paint sprayouts and microscopy.

Super-imposed with reflectance curve 82 on the graph of FIG. 8 is the theoretical reflectance curve for a pure aluminum flake 84 and the predicted reflectance curves of an aluminum flake coated with either magnesium fluoride 86 or silicon dioxide 88. The predicted curves are modeled upon the reflectance of aluminum as a function of various wavelengths for a single aluminum flake, plus a plurality of flakes. What should be appreciated is that although the actual observed results in reflectance curve 82 are below the predicted reflectance values at wavelengths of less than about 680 nm, the actual observed reflectance is above the predicted reflectance response for silicon dioxide 88 above about 680 nm.

While it might appear that the theoretical or predicted responses have been incorrectly modeled, it has been surprisingly discovered that the better-than-modeled reflectance response is a twofold advantageous result of the core flake sections of the pigment of the present invention. Not only are the core flake sections so rigid as to exhibit favorable planar characteristics individually, but the core flake sections, as a plurality of flakes, are so thin that the flakes are believed to provide for an enlarged surface area being exposed to incident light which enables a larger reflectance to be exhibited therefrom. Even though added layers are disposed about the core flake section, the specular reflectance response is still improved because the interference effects are maximized.

From FIG. 8, it should also be appreciated that the measured reflectance results for all known prior aluminum-based pigments falls below 75%. Thus, the improved core flake sections of the flake-based pigments of the present invention achieve, at a minimum, at least about a 5% improvement in total reflectance and a 10% improvement in specular reflectance over prior aluminum-based pigments. Not only are these results significantly better than prior aluminum-based pigments, these results are better than what has heretofore ever been predicted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A highly reflective flake-based pigment, comprising:
   a plurality of core flake sections with substantial rigidity, each of the core flake sections including a reflector layer having a top surface, a bottom surface, and at least one side surface, and a support layer preformed on at least one of the top and bottom surfaces but not on the at least one side surface of the reflector layer;
   a first dielectric coating substantially surrounding each of the core flake sections; and
   a first absorber coating substantially surrounding the first dielectric coating.

2. The pigment of claim 1, wherein the reflector layer comprises a material selected from the group consisting of a transition metal, a lanthanide metal, and combinations thereof.

3. The pigment of claim 1, wherein the reflector layer comprises a material selected from the group consisting of aluminum, copper, silver, gold, platinum, palladium, nickel, cobalt, tin, niobium, chromium, and combinations or alloys thereof.

4. The pigment of claim 1, wherein the reflector layer comprises a material selected from the group consisting of a metal carbide, a metal oxide, a metal nitride, a metal sulfide, and combinations thereof.

5. The pigment of claim 1, wherein the reflector layer has a thickness in a range from about 40 nm to about 150 nm.

6. The pigment of claim 1, wherein the support layer comprises a material selected from the group consisting of metal fluorides, metal oxides, metal sulfides, metal nitrides, metal carbides, and combinations thereof.

7. The pigment of claim 1, wherein the support layer comprises a material selected from the group consisting of magnesium fluoride, silicon monoxide, silicon dioxide, aluminum oxide, titanium dioxide, zinc sulfide, and combinations thereof.

8. The pigment of claim 1, wherein the support layer has a thickness in a range from about 10 nm to about 200 nm.

9. The pigment of claim 1, wherein the first dielectric coating has an index of refraction of about 1.65 or less.

10. The pigment of claim 9, wherein the first dielectric coating comprises a material selected from the group consisting of silicon dioxide, aluminum oxide, magnesium fluoride, aluminum fluoride, cerium fluoride, lanthanum fluoride, sodium aluminum fluorides, neodymium fluoride, samarium fluoride, barium fluoride, calcium fluoride, lithium fluoride, and combinations thereof.

11. The pigment of claim 9, wherein the first dielectric coating comprises a material selected from the group consisting of acrylates, perfluoroalkenes, polytetrafluoroethylene, fluorinated ethylene propylene, and combinations thereof.

12. The pigment of claim 1, wherein the first dielectric coating has an index of refraction of greater than about 1.65.

13. The pigment of claim 12, wherein the first dielectric coating comprises a material selected from the group consisting of zinc sulfide, zinc oxide, zirconium oxide, titanium dioxide, carbon, indium oxide, indium-tin-oxide, tantalum pentoxide, ceric oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

14. The pigment of claim 1, wherein the first dielectric coating has a thickness in a range from about 50 nm to about 800 nm.

15. The pigment of claim 1, wherein the first absorber coating comprises a material selected from the group consisting of chromium, nickel, iron, titanium, aluminum, tungsten, molybdenum, niobium, Ni—Cr—Fe, and combinations or alloys thereof.

16. The pigment of claim 1, wherein the first absorber coating has a thickness in a range from about 2 nm to about 80 nm.

17. The pigment of claim 1, wherein the core flake section has a uniaxial compressive strength at least about 6 times greater than a uniaxial tensile strength thereof.

18. The pigment of claim 1, further comprising a second dielectric coating substantially surrounding the first absorber coating, and a second absorber coating substantially surrounding the second dielectric coating.

19. The pigment of claim 18, wherein the first and second dielectric coatings have an index of refraction of about 1.65 or less.

20. The pigment of claim 18, wherein the first and second dielectric coatings have an index of refraction of greater than about 1.65.

21. The pigment of claim 18, wherein the first dielectric coating has an index of refraction of about 1.65 or less, and the second dielectric coating has an index of refraction of greater than about 1.65.

22. The pigment of claim 18, wherein the first dielectric coating has an index of refraction of greater than about 1.65, and the second dielectric coating has an index of refraction of about 1.65 or less.

23. A highly reflective flake-based pigment, comprising:
   a plurality of core flakes with substantial rigidity, each of the core flakes comprising a reflector layer having a top surface, a bottom surface, and at least one side surface, the reflector layer having a thickness from about 40 nm to about 150 nm, and a support layer preformed at a thickness from about 10 nm to about 200 nm on at least one of the top and bottom surfaces but not on the at least one side surface of the reflector layer;
   a first dielectric coating substantially surrounding each of the core flakes; and
   a first absorber coating substantially surrounding each first dielectric coating.

24. The pigment of claim 23, wherein the reflector layer comprises a material selected from the group consisting of aluminum, copper, silver, gold, platinum, palladium, nickel, cobalt, tin, niobium, chromium, and combinations or alloys thereof.

25. The pigment of claim 23, wherein the support layer comprises a material selected from the group consisting of magnesium fluoride, silicon monoxide, silicon dioxide, aluminum oxide, titanium dioxide, zinc sulfide, and combinations thereof.

26. The pigment of claim 23, wherein the first dielectric coating has an index of refraction of about 1.65 or less.

27. The pigment of claim 26, wherein the first dielectric coating comprises a material selected from the group consisting of silicon monoxide, silicon dioxide, aluminum oxide, magnesium fluoride, aluminum fluoride, cerium fluoride, lanthanum fluoride, sodium aluminum fluorides, neodymium fluoride, samarium fluoride, barium fluoride, calcium fluoride, lithium fluoride, and combinations thereof.

28. The pigment of claim 26, wherein the first dielectric coating comprises a material selected from the group consisting of acrylates, perfluoroalkenes, polytetrafluoroethylene, fluorinated ethylene propylene, and combinations thereof.

29. The pigment of claim 23, wherein the first dielectric coating has an index of refraction of greater than about 1.65.

30. The pigment of claim 29, wherein the first dielectric coating comprises a material selected from the group consisting of zinc sulfide, zinc oxide, zirconium oxide, titanium dioxide, carbon, indium oxide, indium-tin-oxide, tantalum pentoxide, ceric oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

31. The pigment of claim 23, wherein the first dielectric coating has a thickness in a range from about 50 nm to about 800 nm.

32. The pigment of claim 23, wherein the first absorber coating comprises a material selected from the group consisting of chromium, nickel, iron, titanium, aluminum, tungsten, molybdenum, niobium, Ni—Cr—Fe, and combinations or alloys thereof.

33. The pigment of claim 23, wherein the first absorber coating has a thickness in a range from about 2 nm to about 80 nm.

34. The pigment of claim 23, wherein each of the core flakes has a uniaxial compressive strength at least about 6 times greater than a uniaxial tensile strength thereof.

35. The pigment of claim 23, further comprising a second dielectric coating substantially surrounding the first absorber coating, and a second absorber coating substantially surrounding the second dielectric coating.

36. The pigment of claim 35, wherein the first and second dielectric coatings have an index of refraction of about 1.65 or less.

37. The pigment of claim 35, wherein the first and second dielectric coatings have an index of refraction of greater than about 1.65.

38. The pigment of claim 35, wherein the first dielectric coating has an index of refraction of about 1.65 or less, and the second dielectric coating has an index of refraction of greater than about 1.65.

39. The pigment of claim 35, wherein the first dielectric coating has an index of refraction of greater than about 1.65, and the second dielectric coating has an index of refraction of about 1.65 or less.

40. A reflective flake, comprising:
a core flake section with substantial rigidity and including a reflector layer having a top surface, a bottom surface, and at least one side surface, and a support layer preformed on at least one of the top and bottom surfaces but not on the at least one side surface of the reflector layer;
a first dielectric coating substantially surrounding the core flake section; and
a first absorber coating substantially surrounding the first dielectric coating.

41. The flake of claim 40, wherein the reflector layer comprises a material selected from the group consisting of aluminum, copper, silver, gold, platinum, palladium, nickel, cobalt, tin, niobium, chromium, and combinations or alloys thereof.

42. The flake of claim 40, wherein the reflector layer has a thickness in a range from about 40 nm to about 150 nm.

43. The flake of claim 40, wherein the support layer comprises a material selected from the group consisting of magnesium fluoride, silicon monoxide, silicon dioxide, aluminum oxide, titanium dioxide, zinc sulfide, and combinations thereof.

44. The flake of claim 40, wherein the support layer has a thickness in a range from about 10 nm to about 200 nm.

45. The flake of claim 40, wherein the first dielectric coating has an index of refraction of about 1.65 or less.

46. The flake of claim 45, wherein the first dielectric coating comprises a material selected from the group consisting of silicon monoxide, silicon dioxide, aluminum oxide, magnesium fluoride, aluminum fluoride, cerium fluoride, lanthanum fluoride, sodium aluminum fluorides, neodymium fluoride, samarium fluoride, barium fluoride, calcium fluoride, lithium fluoride, and combinations thereof.

47. The flake of claim 45, wherein the first dielectric coating comprises a material selected from the group consisting of acrylates, perfluoroalkenes, polytetrafluoroethylene, fluorinated ethylene propylene, and combinations thereof.

48. The flake of claim 40, wherein the first dielectric coating has an index of refraction of greater than about 1.65.

49. The flake of claim 48, wherein the first dielectric coating comprises a material selected from the group consisting of zinc sulfide, zinc oxide, zirconium oxide, titanium dioxide, carbon, indium oxide, indium-tin-oxide, tantalum pentoxide, ceric oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

50. The flake of claim 40, wherein the first dielectric coating has a thickness in a range from about 50 nm to about 800 nm.

51. The flake of claim 40, wherein the first absorber coating comprises a material selected from the group consisting of chromium, nickel, iron, titanium, aluminum, tungsten, molybdenum, niobium, Ni—Cr—Fe, and combinations or alloys thereof.

52. The flake of claim 40, wherein the first absorber coating has a thickness in a range from about 2 nm to about 80 nm.

53. The flake of claim 40, wherein the core flake section has a uniaxial compressive strength at least about 6 times greater than a uniaxial tensile strength thereof.

54. The flake of claim 40, further comprising a second dielectric coating substantially surrounding the first absorber coating, and a second absorber coating substantially surrounding the second dielectric coating.

55. The flake of claim 54, wherein the first and second dielectric coatings have an index of refraction of about 1.65 or less.

56. The flake of claim 54, wherein the first and second dielectric coatings have an index of refraction of greater than about 1.65.

57. The flake of claim 54, wherein the first dielectric coating has an index of refraction of about 1.65 or less, and the second dielectric coating has an index of refraction of greater than about 1.65.

58. The flake of claim 54, wherein the first dielectric coating has an index of refraction of greater than about 1.65, and the second dielectric coating has an index of refraction of about 1.65 or less.

59. A reflective flake, comprising:
a core flake section with substantial rigidity, the core flake section comprising a reflector layer having a top surface, a bottom surface, and at least one side surface, the reflector layer having a thickness from about 40 nm to about 150 nm, and a support layer preformed at a thickness from about 10 nm to about 200 nm on at least one of the top and bottom surfaces but not on the at least one side surface of the reflector layer;

a first dielectric coating substantially surrounding the core flake section; and a first absorber coating substantially surrounding the first dielectric coating.

60. The flake of claim 59, wherein the reflector layer comprises a material selected from the group consisting of aluminum, copper, silver, gold, platinum, palladium, nickel, cobalt, tin, niobium, chromium, and combinations or alloys thereof.

61. The flake of claim 59, wherein the support layer comprises a material selected from the group consisting of magnesium fluoride, silicon monoxide, silicon dioxide, aluminum oxide, titanium dioxide, zinc sulfide, and combinations thereof.

62. The flake of claim 59, wherein the first dielectric coating has an index of refraction of about 1.65 or less.

63. The flake of claim 62, wherein the first dielectric coating comprises a material selected from the group consisting of silicon monoxide, silicon dioxide, aluminum oxide, magnesium fluoride, aluminum fluoride, cerium fluoride, lanthanum fluoride, sodium aluminum fluorides, neodymium fluoride, samarium fluoride, barium fluoride, calcium fluoride, lithium fluoride, and combinations thereof.

64. The flake of claim 59, wherein the first dielectric coating has an index of refraction of greater than about 1.65.

65. The flake of claim 64, wherein the first dielectric coating comprises a material selected from the group consisting of zinc sulfide, zinc oxide, zirconium oxide, titanium dioxide, carbon, indium oxide, indium-tin-oxide, tantalum pentoxide, ceric oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

66. The flake of claim 59, wherein the first absorber coating comprises a material selected from the group consisting of chromium, nickel, iron, titanium, aluminum, tungsten, molybdenum, niobium, Ni—Cr—Fe, and combinations or alloys thereof.

67. The flake of claim 59, further comprising a second dielectric coating substantially surrounding the first absorber coating, and a second absorber coating substantially surrounding the second dielectric coating.

68. The flake of claim 67, wherein the first and second dielectric coatings have an index of refraction of about 1.65 or less.

69. The flake of claim 67, wherein the first and second dielectric coatings have an index of refraction of greater than about 1.65.

70. The flake of claim 67, wherein the first dielectric coating has an index of refraction of about 1.65 or less, and the second dielectric coating has an index of refraction of greater than about 1.65.

71. The flake of claim 67, wherein the first dielectric coating has an index of refraction of greater than about 1.65, and the second dielectric coating has an index of refraction of about 1.65 or less.

72. A reflective flake, comprising:

a core flake section with substantial rigidity, the core flake section comprising a reflector layer having a top surface, a bottom surface, and at least one side surface, and a support layer preformed at a thickness from about 10 nm to about 200 nm on at least one of the top and bottom surfaces but not on the at least one side surface of the reflector layer, wherein the core flake section has a uniaxial compressive strength at least about 6 times greater than a uniaxial tensile strength thereof;

a first dielectric coating substantially surrounding the core flake section; and a first absorber coating substantially surrounding the first dielectric coating.

* * * * *